United States Patent [19]
Lo et al.

[11] Patent Number: 5,850,278
[45] Date of Patent: Dec. 15, 1998

[54] OPTICAL 3D PRINTER WITH EXTENDED ANGULAR COVERAGE

[76] Inventors: Allen Kwok Wah Lo, 5022 Hidden Branches Dr., Dunwoody, Ga. 30338; Kenneth Quochuy Lao, 650 Glen Ave., Westfield, N.J. 07090

[21] Appl. No.: 919,516

[22] Filed: Aug. 28, 1997

[51] Int. Cl.$^6$ ............................. G03B 27/32; B41B 15/00
[52] U.S. Cl. ............................................... 355/22; 395/117
[58] Field of Search .................... 352/86, 43; 353/10; 355/22; 359/458; 396/327, 330; 395/117, 105

[56] References Cited

U.S. PATENT DOCUMENTS

| | | | |
|---|---|---|---|
| 2,002,090 | 5/1935 | Ives | 352/43 |
| 5,408,294 | 4/1995 | Lam | 355/22 |
| 5,412,449 | 5/1995 | Lam . | |
| 5,583,971 | 12/1996 | Lo | 395/117 |
| 5,625,435 | 4/1997 | Lo et al. | 355/22 |
| 5,717,844 | 2/1998 | Lo et al. | 395/117 |

*Primary Examiner*—Safet Metjahic
*Assistant Examiner*—Hung Henry Nguyen
*Attorney, Agent, or Firm*—Kenneth Q. Lao

[57] ABSTRACT

This disclosure is concerned with an optical printer for making 3D and animation pictures from a plurality of 2D images on a lenticular print material. The 2D images are sequentially projected by a projection lens onto the print material at different projection angles. In order to change the projection angles, the print material and the projection lens are moved relative to the film to different positions. The method and apparatus, according to the present invention, use a tilting mechanism to tilt the print material about an axis parallel to the longitudinal axis of the lenticules and away from the optical axis of the projection lens so as to reduce the moving distance of the print material and the projection lens. In effect, the angular coverage of the printer is extended by the tilting of the print material and, therefore, the printer can make 3D and animation pictures on a print material having a wider viewing angle.

10 Claims, 6 Drawing Sheets

OPTICAL 3D PRINTER WITH EXTENDED ANGULAR COVERAGE

FIELD OF THE INVENTION

The present invention related to an optical printer for making 3D pictures.

BACKGROUND OF THE INVENTION

In the making of a lenticular 3D or animation picture, the basic process involves the projection by a projection lens of a plurality of 2D images, each at a different projection angle, onto a lenticular print material to form a line-form composite image on the photosensitive emulsion layer underlying the lenticules. This projection printing method is well-known and has been disclosed in numerous patents. For example, U.S. Pat. No. 5,412,449 (LAM) discloses a single-stage printer for making 3D pictures from 2D images recorded on film. As disclosed in LAM, the projection angles are achieved by moving the projection lens and the print material to different locations relative to the exposing position of the 2D images. The moving distance of the print material is generally limited by the field coverage angle of the projection lens and/or the physical dimension of the printer. The limitation on the moving distance, in turn, limits the total viewing angle of the lenticules on the lenticular print material. In general, in order to produce a 3D picture on a print material with a large viewing angle, the printer is rather bulk as it must accommodate the long moving distance of the print material. Furthermore, the projection lens must have a wide field angle and it can be very expensive.

It is advantageous to provide a 3D printer wherein the moving distance of the print material relative to the exposing position can be reduced and the requirement on the projection lens can be eased.

SUMMARY OF THE INVENTION

It is an objective of the present invention to provide a method and apparatus to extend the angular coverage of an optical 3D printer so that the printer can make 3D pictures on a print material having a broader viewing angle without extending the moving distance of the print material or the field coverage of the projection lens.

It is a further objective of the present invention to provide a method and apparatus to produce 3D and animation pictures wherein different projection angles can be achieved without moving the print material and the projection lens to different locations.

The optical printer for making 3D and animation pictures from a plurality of the 2D images recorded on film, according to the present invention, uses a lamphouse to illuminate film and a film carrier to sequentially place each of the 2D images at the exposing position under the lamphouse. The 2D images are sequentially projected by a projection lens, each at a different projection angle onto the print material so as to expose the photosensitive emulsion layer underlying the lenticules. The print material and the projection lens are laterally moved to different locations, relative to the exposing position, along a direction perpendicular to the longitudinal axis of the lenticules so as to change the projection angles. In order to reduce the moving distance of the print material and the projection lens, the print material is tilted about an axis parallel to the lenticules and away from the optical axis of the projection lens. By tilting the print material for exposure, the printer can make 3D pictures on a print material with a wider viewing angle without extending the moving distance of the print material and the field angle of the projection lens. Furthermore, if the total viewing angle of the lenticules is small, tilting the print material alone may be sufficient to achieve the desired projection angles and, consequently, the repositioning of the print material and the lens can be eliminated.

The same printer can also be used to make 3D and animation pictures through a parallax barrier plate, instead of a lenticular screen.

The objectives and the scope of the present invention will become apparent upon reading the description of the drawing figures.

DETAILED DESCRIPTION OF THE DRAWING

Figure 1:
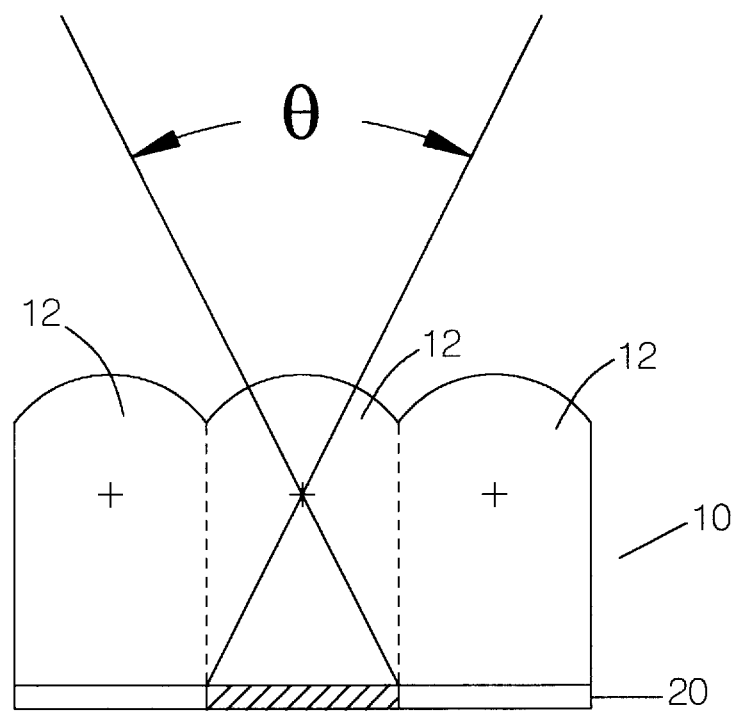
FIG. 1 illustrates the total viewing angle of the lenticules.

FIG. 1 illustrates the total viewing angle of the lenticules on a lenticular print material. FIG. 1, numeral 10 denotes a section of the lenticular print material, showing the cross section of three lenticules 12 and the underlying photosensitive emulsion layer 20. The shaded area on the emulsion layer 20 represents the image area under a lenticule, and Θ denotes the total viewing angle of the lenticules 12.

Figure 2:
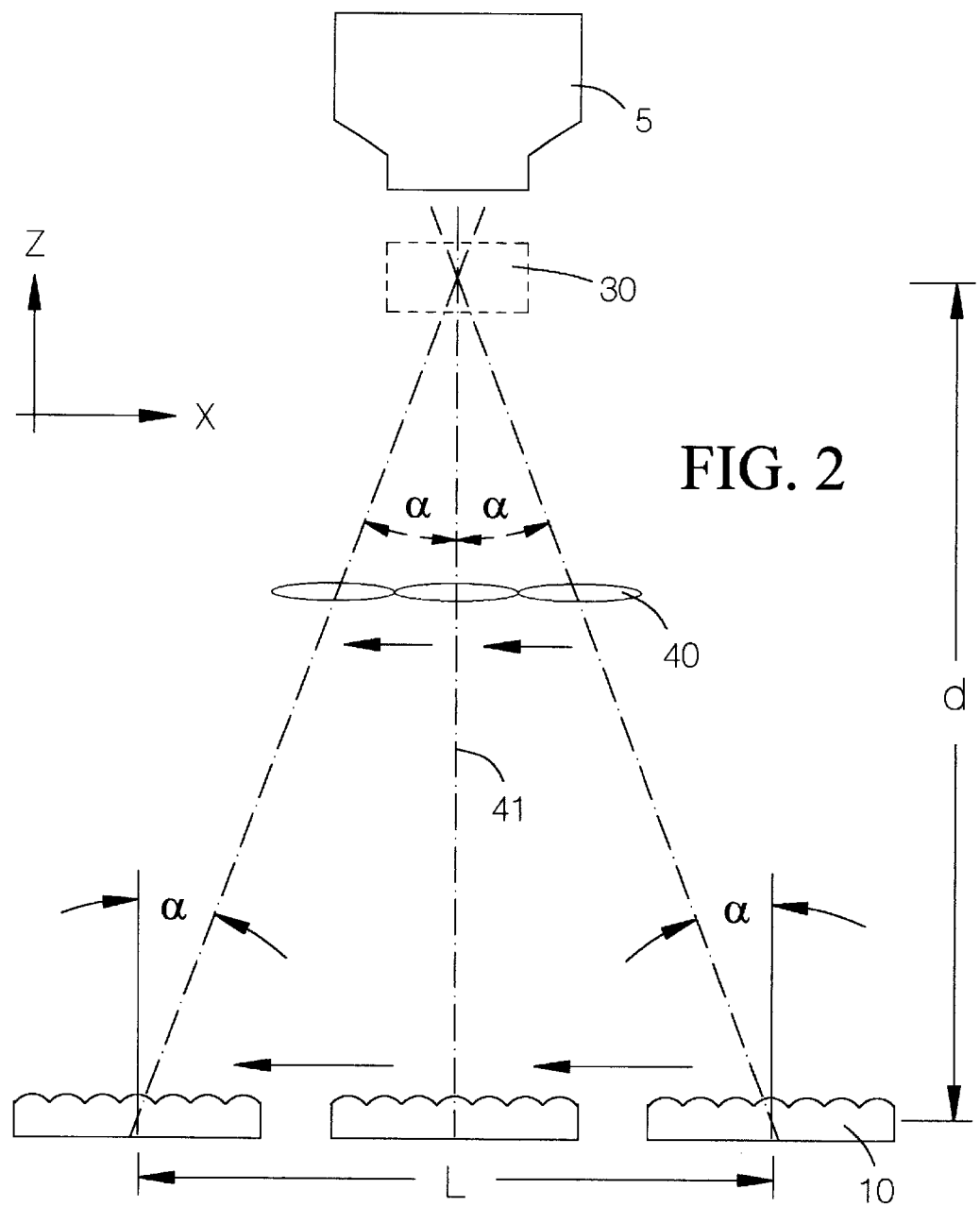
FIG. 2 illustrates the projection angles to fill the image area under the lenticules in prior art.

FIG. 2 illustrates the projection angles to fill the image area under the lenticules in prior art. For illustrative purposes only, FIG. 2 shows the projection of 2D images at three different projection angles to fill the image area under each lenticule. In FIG. 2, numeral 5 denotes a lamphouse, and numeral 30 denotes the exposing position under the lamphouse where 2D images are sequentially brought into place to be projected by a projection lens 40. It is understood that each of the lenticules on the print material 10 has a longitudinal axis perpendicular to both the X and Z axes, as illustrated. During the printing process, the projection lens 40 and the print material 10 are moved to different positions, relative to the exposing position 30 and in a direction parallel to the X axis, so as to project each 2D image onto the print material at a different projection angle. The total projection angle, in this case, is equal to $2\alpha$, given by:

$$2\alpha = \Theta(N-1)/N \quad (1)$$

where N (=3) is the number of 2D images to be projected onto the print material. The total moving distance, L, of the print material is given by $$L = 2d\tan\alpha \quad (2)$$

where d is the distance between the print material and the exposing position.

Figure 3:
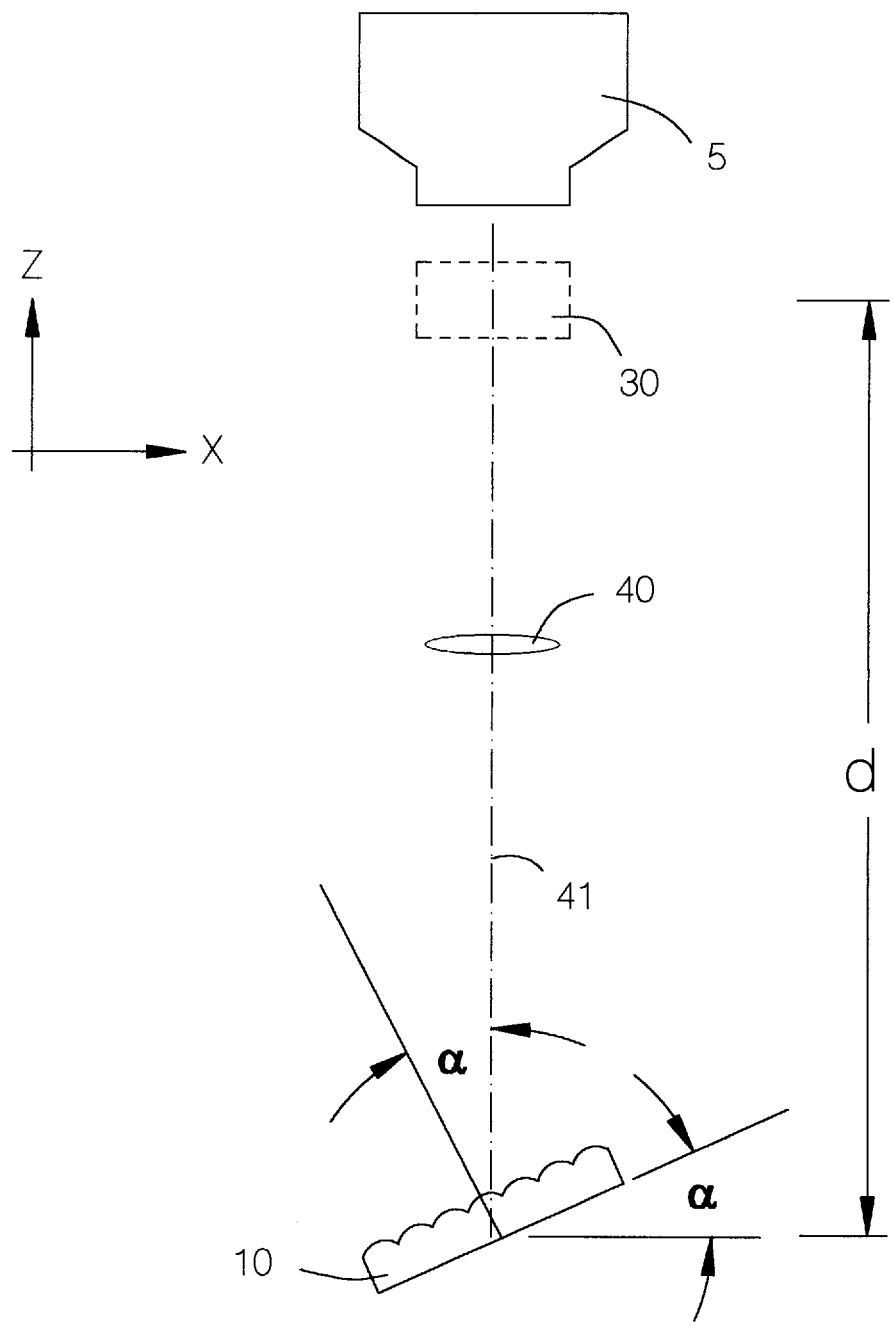
FIG. 3 illustrates the tilting of the print material to fill the image area under the lenticules.

FIG. 3 illustrates the tilting of the print material to fill the image area under the lenticules, according to the present invention. As shown, the print material 10 is tilted to the left by an angle $\alpha$ about an axis parallel to the longitudinal axis of the lenticules for exposing one 2D image. In terms of the projection angle on the print material, this is equivalent to moving the print material to the left by a distance L/2 as shown in FIG.2. Similarly, the print material 10 can be tilted to the right by an angle α for exposing another 2D image. Thus, without laterally moving the print material and the projection lens, three 2D images can be projected onto the print materials at three different projection angles: α (right), 0, and α (left). However, when the tilting angle is too large, this method could cause the projected image on the print material to become out of focus and distorted. The distortion can be reduced by laterally moving the print material in addition to tilting it.

Figure 4:
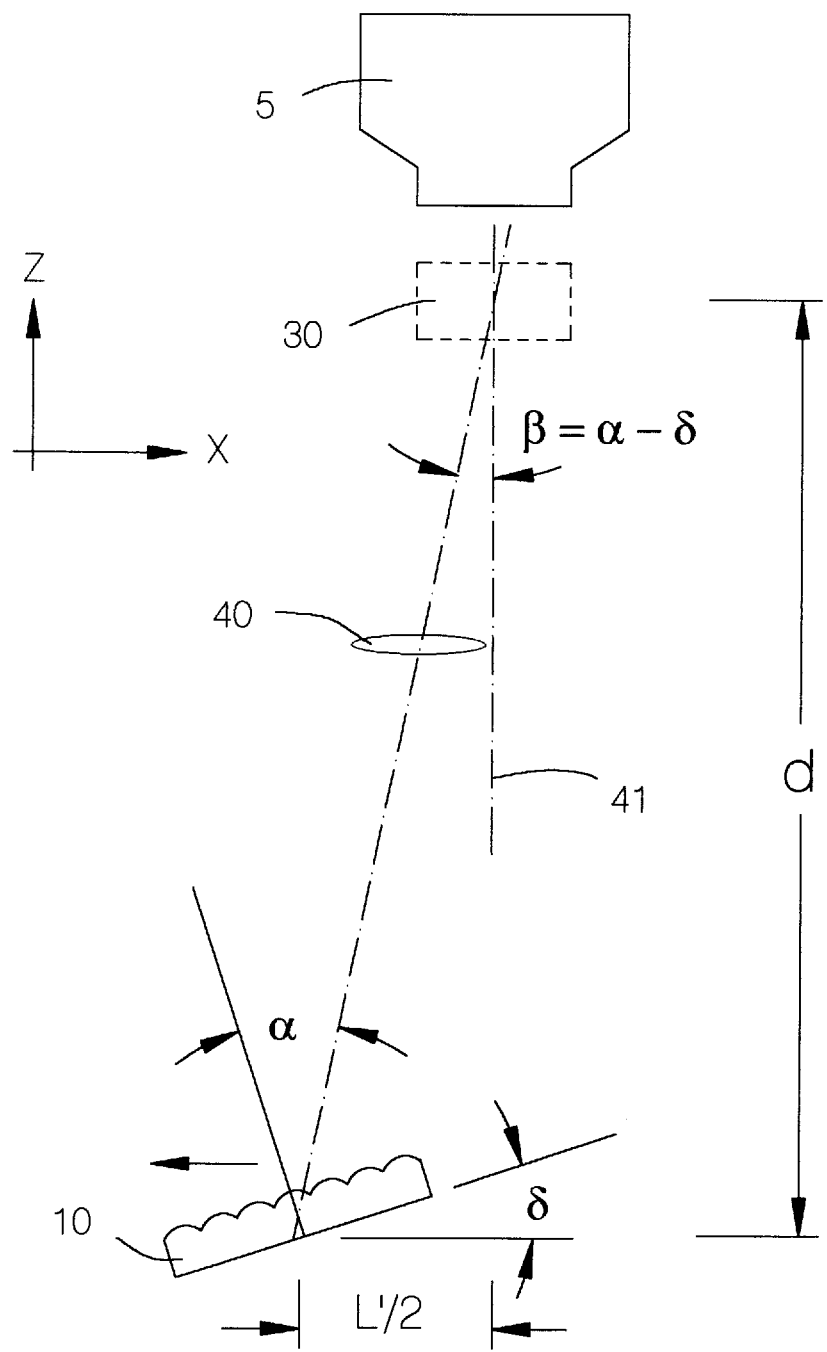
FIG. 4 illustrates the combination of moving and tilting of the print material to fill the image area under the lenticules.

FIG.4 illustrates the combination of moving and tilting of the print material to fill the image area under the lenticules, according to the present invention. As shown, the print material is laterally moved by a distance L'/2, and the projection lens 40 is shifted proportionally to achieve a projection angle β. The print material 10 is also tilted to the left by an angle δ (=α−β). The combination of moving and tilting results in an effective projection angle of α=β+δ on the print material. Thus, even though the same projection angle α is achieved on the print material, the total moving distance, L', of the print material is shorter than L, where $$L' = 2d\tan(\alpha - \delta) \qquad (3)$$

At all times, the projection lens is properly focused on the print material and the 2D image placed in the exposing position under the lamphouse. Because the projection angle β through the lens is smaller than α as required in prior art (FIG. 2), the projection lens can have a narrower field angle while achieving the same projection angle on the print material. In effect, the angular coverage of the 3D printer is extended, allowing the printer to make 3D pictures on a print material having a wider viewing angle.

Figure 5:
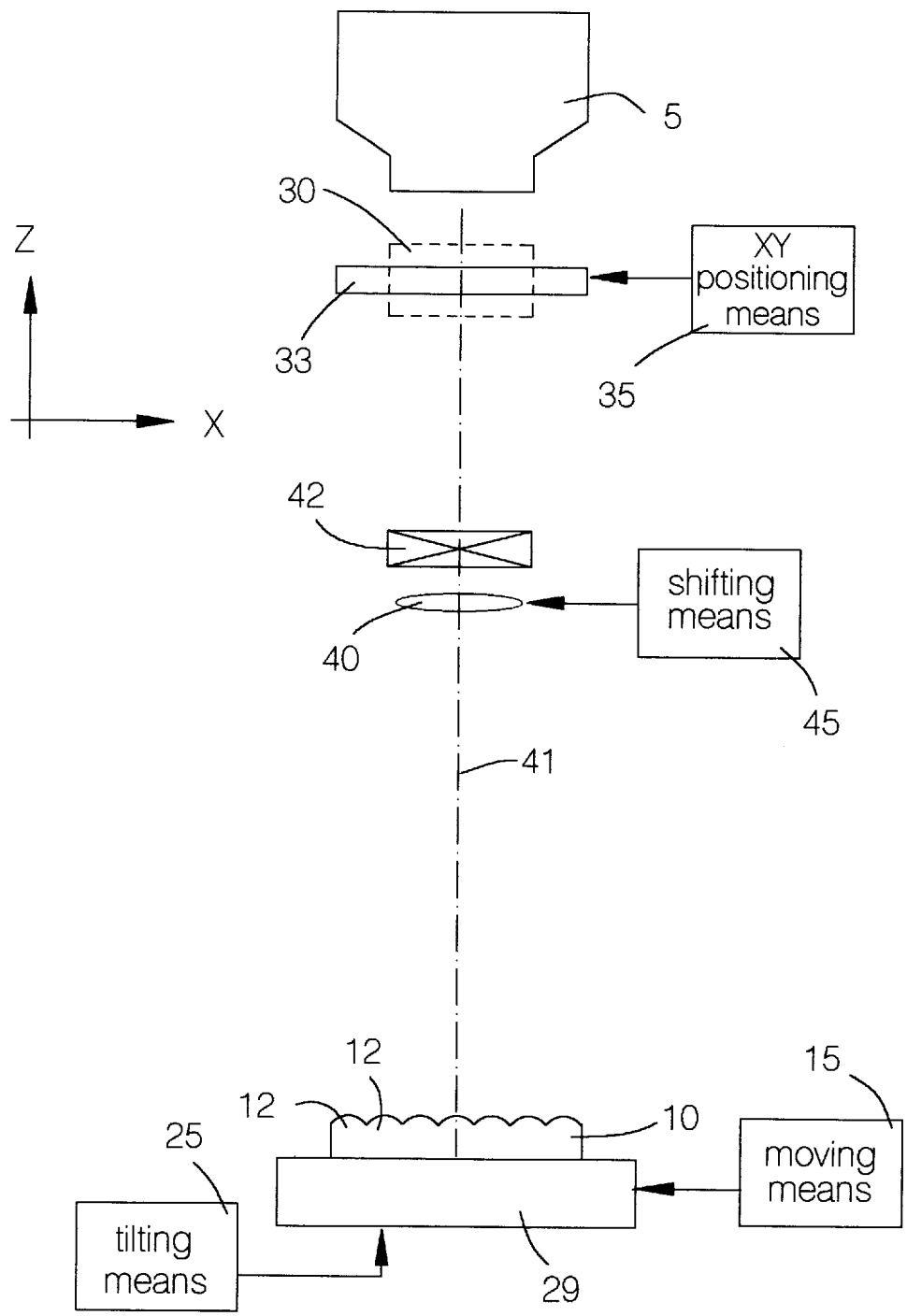
FIG. 5 illustrates the preferred embodiment of the present invention.

FIG. 5 illustrates the preferred embodiment of the optical printer for making 3D and animation pictures from a plurality of 2D images recorded on film, according to the present invention. As shown in FIG. 5, the optical printer comprises a lamphouse 5, a film carrier 33, a shutter 42 to control the exposure time, a projection lens 40, and a platform 29 for securing the print material 10. Each of the lenticules on the print material has a longitudinal axis which is perpendicular to both the X and Z axes as illustrated. The optical axis of the projection lens is denoted by numeral 41. The film carrier 33 is used to hold the film in place during the printing process. The film carrier can simply be two pieces of glass to hold a strip of film. But it can also be equipped with spools and rollers to guide and move a roll of film and a pressure plate to hold the film during the printing process. An XY positioning means 35 is used to sequentially place each of 2D images at the exposing position 30 for exposure. The same XY positioning means, if necessary, can be used to adjust each 2D image for alignment purposes. A shifting means 45 is used to move the projection lens 40, and a moving means 15 is used to move the print material 10 to different positions for changing the projection angles. A tilting means 25 is used to tilt the print material 10 away from the optical axis 41 so as to extend the projection angle on the print material. The moving means 15 and the shifting means 45 can be driven by separate motors so that the movement of the projection lens and the movement of the print material can be independent of each other. Alternatively, a proportional rod can be used to provide mechanical linkage between the projection lens 40 and the print material platform 29 so that the projection lens and the print material can be simultaneously moved by either the shifting means 45 or the moving means 15.

It should be noted that the 2D images can be oriented in different directions as they are projected onto the print material 10: the upright direction of the images can be parallel or perpendicular to the longitudinal axis of the lenticules. It is understood that the lamphouse may comprise a plurality of color filters to adjust the color contents of the light output from the lamphouse.

It should also be noted that the movement of the print material is relative to the film. Thus, it is also possible to move the film, instead of the print material, to achieve the same projection angles. Moreover, if necessary, the film carrier can also be tilted to correct for the image distortion due to the tilting of the print material.

Figure 6:
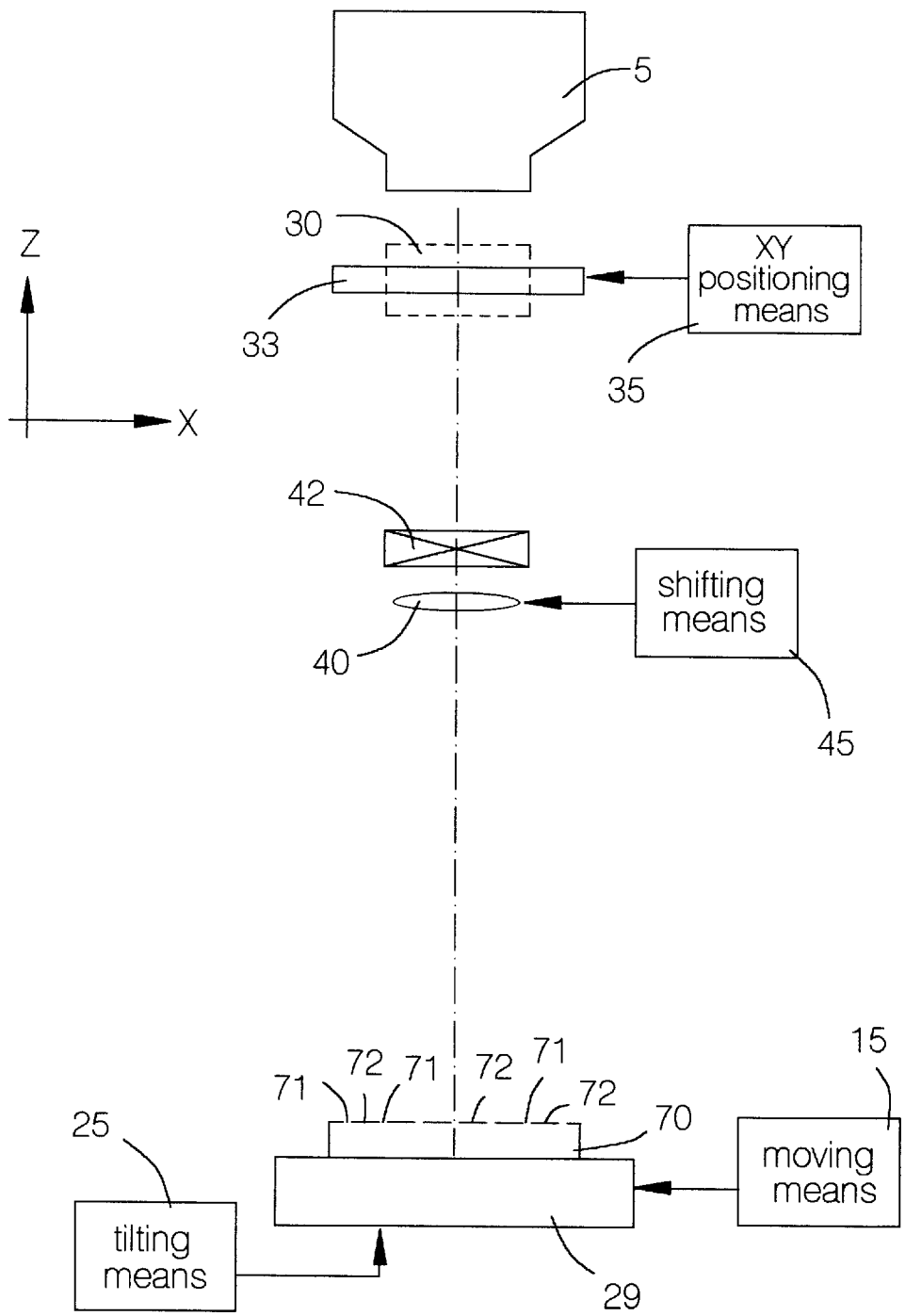
FIG. 6 illustrates a parallax barrier being used in lieu of a lenticular screen.

FIG.6 illustrates a parallax barrier plate being used in lieu of a lenticular screen. Like a lenticular screen having lenticules, a parallax barrier plate having alternate blocking strips and clear strips is commonly used as a view-separating screen on a 3D picture. As shown, the parallax barrier plate 70 comprises blocking strips 71 and clear strips 72.

The present invention has been described in the preferred forms and the drawing figures are for illustrative purposes only. It shall be understood by those skilled in the art that many modifications, additions and deletions can be made without departing the spirit and the scope of the invention as set forth in the appended claims.

What is claimed is:

1. An optical printer for producing 3D and animation pictures from a plurality of 2D images on a photosensitive emulsion layer secured to a view-separating screen, said view separating screen having a longitudinal axis and said 2D images being recorded on film, said printer comprising:

a) means for carrying said film;

b) projection lens means properly focusing on said film and said photosensitive emulsion layer to project each of said 2D images at a different projection angle through said view-separating screen onto said photosensitive emulsion layer;

c) a lamphouse to illuminate the film for exposure;

d) means for tilting said photosensitive emulsion layer together with said view-separating screen at different angles about an axis parallel to said longitudinal axis to achieve different projection angles; and e) means for adjusting the XY position of the 2D images for alignment.

2. The optical printer of claim 1 further comprising:

a platform to hold said view-separating screen together with said photosensitive emulsion layer, and means for moving said platform in a direction perpendicular to the longitudinal axis so as to change the projection angles.

3. The optical printer of claim 1 further comprising means for moving the projection lens to different positions so as to change the projection angles.

4. An optical printer for producing 3D and animation pictures from a plurality of 2D images on a photosensitive emulsion layer secured to a view-separating screen, said view separating screen having a longitudinal axis and said 2D images being recorded on film, said printer comprising:

a) means for carrying said film;

b) projection lens means properly focusing on said film and said photosensitive emulsion layer to project each of said 2D images at a different projection angle through said view-separating screen onto said photosensitive emulsion layer;

c) a lamphouse to illuminate the film for exposure;

d) means for tilting said photosensitive emulsion layer together with said view-separating screen at different angles about an axis parallel to said longitudinal axis to achieve different projection angles;

e) a platform to hold said view-separating screen together with said photosensitive emulsion layer, and f) means for moving said platform in a direction perpendicular to the longitudinal axis so as to change the projection angles.

5. An optical printer for producing 3D and animation pictures from a plurality of 2D images on a photosensitive emulsion layer secured to a view-separating screen, said view separating screen having a longitudinal axis and said 2D images being recorded on film, said printer comprising:

a) means for carrying said film;

b) projection lens means properly focusing on said film and said photosensitive emulsion layer to project each of said 2D images at a different projection angle through said view-separating screen onto said photosensitive emulsion layer;

c) a lamphouse to illuminate the film for exposure;

d) means for tilting said photosensitive emulsion layer together with said view-separating screen at different angles about an axis parallel to said longitudinal axis to achieve different projection angles; and e) means for moving the projection lens to different positions so as to change the projection angles.

6. A method of printing 3D and animation pictures from a plurality of 2D images on a photosensitive emulsion layer secured to a view-separating screen having a longitudinal axis, said 2D images being recorded on film which is illuminated by a lamphouse during printing for exposure, said method comprising the steps of:

a) sequentially moving said 2D images into an exposing position under the lamphouse;

b) tilting said photosensitive emulsion layer together with said view-separating screen at different angles so as to achieve different projection angles;

c) adjusting the XY position of said 2D images for alignment; and d) projecting the 2D images positioned in the exposing position so as to expose said photosensitive emulsion through said view-separating screen at a different projection angle.

7. The method of claim 6 further comprising the step of tilting the film so as to correct for the image distortion due to the tilting of the photosensitive emulsion.

8. The method of claim 6 wherein the projecting of 2D images is effected by a projection lens, said method further comprising the steps of moving said photosensitive emulsion layer together with said view-separating screen and moving said projection lens to different positions relative to the exposing position so as to change the projection angles.

9. The method of claim 6 wherein said view-separating screen is a lenticular screen having a plurality of linear lenticules parallel to the longitudinal axis of said view-separating screen.

10. The method of claim 6 wherein said view-separating screen is a parallax barrier plate having alternate blocking strips and clear strips parallel to the longitudinal axis of said view-separating screen.

* * * * *